US012687733B2

(12) United States Patent
Guo et al.

(10) Patent No.: US 12,687,733 B2
(45) Date of Patent: Jul. 21, 2026

(54) POLARIZATION SPLITTING DEVICE, POLARIZATION SPLITTING STRUCTURE AND PROJECTION DEVICE

(71) Applicant: APPOTRONICS CORPORATION LIMITED, Shenzhen (CN)

(72) Inventors: Zuqiang Guo, Guangdong (CN); Chen Chen, Guangdong (CN); Fei Hu, Guangdong (CN)

(73) Assignee: APPOTRONICS CORPORATION LIMITED, Shenzhen (CN)

( * ) Notice: Subject to any disclaimer, the term of this patent is extended or adjusted under 35 U.S.C. 154(b) by 716 days.

(21) Appl. No.: 17/790,486

(22) PCT Filed: Dec. 17, 2020

(86) PCT No.: PCT/CN2020/137091
§ 371 (c)(1),
(2) Date: Jun. 30, 2022

(87) PCT Pub. No.: WO2021/135960
PCT Pub. Date: Jul. 8, 2021

(65) Prior Publication Data
US 2023/0048432 A1 Feb. 16, 2023

(30) Foreign Application Priority Data
Dec. 31, 2019 (CN) ........................ 201922476554.X

(51) Int. Cl.
*G02B 27/14* (2006.01)
*G02B 27/28* (2006.01)
*G03B 35/26* (2021.01)

(52) U.S. Cl.
CPC ........... *G02B 27/14* (2013.01); *G02B 27/283* (2013.01); *G02B 27/286* (2013.01); *G03B 35/26* (2013.01)

(58) Field of Classification Search
CPC .... G02B 27/14; G02B 27/283; G02B 27/286; G03B 35/26
(Continued)

(56) References Cited

U.S. PATENT DOCUMENTS

2012/0268718 A1 10/2012 Kobayashi

FOREIGN PATENT DOCUMENTS

CN 101539668 A 9/2009
CN 105681592 A 6/2016
(Continued)

OTHER PUBLICATIONS

International Search Report dated Mar. 17, 2021 and English translation thereof, for corresponding International Application No. PCT/CN2020/137091.

*Primary Examiner* — Wyatt A Stoffa
*Assistant Examiner* — Grant A Gagnon
(74) *Attorney, Agent, or Firm* — Tarolli, Sundheim, Covell & Tummino LLP

(57) ABSTRACT

Provided is a polarization splitting device. The polarization splitting device includes a first optical element. The first optical element comprises a light incident surface, a polarization splitting interface and a reflective interface, and the polarization splitting interface and the reflective interface are correspondingly arranged. Incident light enters the first optical element through the light incident surface, and is split into first light and second light through the polarization splitting interface; the first light is incident on the reflective interface after being reflected by the polarization splitting interface, and exits from the first optical element after being reflected by the reflective interface; and the second light exits from the first optical element after being transmitted through the polarization splitting interface.

16 Claims, 2 Drawing Sheets

(58) Field of Classification Search
USPC .......................................................... 359/485
See application file for complete search history.

(56) References Cited

FOREIGN PATENT DOCUMENTS

| | | | |
|---|---|---|---|
| CN | 209148986 | U | 7/2019 |
| CN | 211506152 | U | 9/2020 |
| JP | 2005128241 | A | 5/2005 |

POLARIZATION SPLITTING DEVICE, POLARIZATION SPLITTING STRUCTURE AND PROJECTION DEVICE

CROSS-REFERENCE TO RELATED APPLICATIONS

This application is a national stage of International Application No. PCT/CN2020/137091, filed on Dec. 17, 2020, which claims priority to Chinese Patent Application No. 201922476554.X, filed on Dec. 31, 2019. All of the aforementioned applications are hereby incorporated by reference in their entireties.

TECHNICAL FIELD

The present disclosure relates to the field of optical projection, and in particular to a polarization splitting device, a polarization splitting structure and a projection device.

BACKGROUND

In the field of optical projection, it is often necessary to split incident light into polarized light by a polarization splitting device to meet the needs of optical instruments. The components in the polarization splitting device need to be connected by a glue substance. Due to the irradiation of light, the glue substance will rapidly age because of the high temperature, which will lead to deterioration of the performance of the polarization splitting device.

SUMMARY

An embodiment of the present disclosure provides a polarization splitting device, including a first optical element. The first optical element includes a light incident surface, a polarization splitting interface and a reflective interface, and the polarization splitting interface and the reflective interface are correspondingly arranged. Incident light enters the first optical element through the light incident surface, and is split into first light and second light through the polarization splitting interface; the first light is incident on the reflective interface after being reflected by the polarization splitting interface, and exits from the first optical element after being reflected by the reflective interface; and the second light exits from the first optical element after being transmitted through the polarization splitting interface.

In an embodiment of the present disclosure, the polarization splitting interface and the reflective interface are arranged in parallel, and the light incident surface is located between the polarization splitting interface and the reflective interface.

In an embodiment of the present disclosure, the polarization splitting device includes a second optical element and a first bonding element. The second optical element is bonded to the polarization splitting interface of the first optical element through the first bonding element, in such a manner that the second light transmitted from the polarization splitting interface enters the second optical element and is guided by and exits from the second optical element, and the first light reflected by the polarization splitting interface does not pass through the first bonding element.

In an embodiment of the present disclosure, a bonding interface where the second optical element is bonded to the first optical element is coated with an anti-reflective film.

In an embodiment of the present disclosure, the first optical element and the second optical element each include a polarization beam splitting prism.

In an embodiment of the present disclosure, the polarization splitting device includes a diaphragm. The second optical element includes a first interface parallel to the light incident surface of the first optical element; and the diaphragm is provided between the first interface of the second optical element and the incident light, to prevent the incident light from entering the second optical element.

An embodiment of the present disclosure provides a polarization splitting structure, including: polarization splitting devices described above; and a second bonding element, configured to bond every two adjacent ones of the polarization splitting devices. The first light exits after being reflected by the reflective interface of the first optical element, without passing through the second bonding element.

In an embodiment of the present disclosure, the polarization splitting structure includes first conversion elements. A number of the first conversion elements is in a correspondence with a number of the polarization splitting devices. For each of the polarization splitting devices, the first conversion element covers an exit side of the second optical element and is configured to convert the second light from the second optical element into the first light.

In an embodiment of the present disclosure, the first conversion element is bonded, by a third bonding element, to an exit interface of the second optical element. The second light exits from the exit interface of the second optical element.

In an embodiment of the present disclosure, the polarization splitting structure includes a second conversion element. The second conversion element covers an exit side of each of the polarization splitting devices, and is configured to convert the first light into the second light.

An embodiment of the present disclosure provides a projection device, including: the polarization splitting device described above or the polarization splitting structure described above.

The embodiments of the present disclosure have at least the following beneficial effects.

By controlling the propagation of the first light by the polarization splitting interface and the reflective interface of the first optical element, the first light is guided to propagate inside the first optical element, without being incident to the external glue substance through the first optical element. The present disclosure prevents the glue substance from being damaged by direct irradiation of light, thereby improving the working performance of the polarization splitting device.

DETAILED DESCRIPTION

The specific implementations of the present disclosure will be described below with reference to the drawings.

First Embodiment

Figure 1:
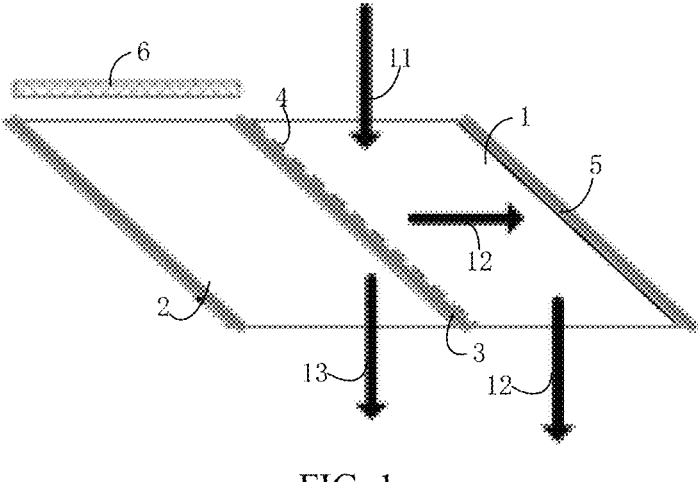
FIG. 1 is a schematic diagram according to a first embodiment of the present disclosure.

As shown in FIG. 1, the first embodiment provides a polarization splitting device, including a first optical element 1.

The first optical element 1 includes a light incident surface, a polarization splitting interface and a reflective interface. The polarization splitting interface and the reflective interface are correspondingly arranged.

Incident light 11 enters the first optical element 1 through the light incident surface, and is split into first light 12 and second light 13 through the polarization splitting interface. The first light 12 is incident on the reflective interface after being reflected by the polarization splitting interface, and exits from the first optical element 1 after being reflected by the reflective interface. The second light 13 exits from the first optical element after being transmitted through the polarization splitting interface.

The first optical element 1 is a polarization splitting prism. As shown in FIG. 1, the polarization splitting interface and the reflective interface of the first optical element 1 are defined as a first interface and a second interface, which are arranged in parallel. The light incident surface is defined as a third interface located between the polarization splitting interface and the reflective interface. A light exit surface of the polarization splitting prism is defined as a fourth interface.

A polarization splitting film 4 coated on the first interface of the polarization splitting prism forms the polarization splitting interface, and a reflective film 5 coated on the second interface of the polarization splitting prism forms the reflective interface.

In order to facilitate the control of exit paths of the first light 12 and the second light 13, the first optical element 1 is designed as a parallelogram. The polarization splitting film 4 and the reflective film 5 are respectively arranged on two opposite sides of the first optical element 1.

In order to facilitate the control of the exit paths of the first light 12 and the second light 13, an angle between an incident direction of the incident light 11 and the reflective film 5 of the polarization splitting film 4 is set to 45°, and an angle between a reflection direction of the first light 12 by the polarization splitting film 4 and the reflective film 5 is set to 45°.

The polarization splitting film 4 is configured to separate light components with different polarization states in the incident light 11, and is a polarization beam splitting medium film (PBS film) in this embodiment.

In this embodiment, the polarization splitting film 4 is configured to separate the incident light 11 into the first light 12 and the second light 13. Generally, polarized light includes P-polarized light and S-polarized light. In this embodiment, if the first light is P-polarized light, the second light is S-polarized light. Similarly, if the first light is S-polarized light, the second light is P-polarized light. The polarization splitting film 4 is configured to transmit the P-polarized light and reflect the S-polarized light, or to reflect the P-polarized light and transmit the S-polarized light.

As shown in FIG. 1, the polarization splitting device includes a second optical element 2 and a first bonding element 3. The second optical element may be a polarization splitting prism. The second optical element 2 is designed as a parallelogram.

The second optical element 2 is bonded to the polarization splitting interface of the first optical element 1 through the first bonding element 3, such that the second light 13 transmitted from the polarization splitting interface enters the second optical element 2, and is guided by and exits from the second optical element 2.

Those of ordinary skill can easily understand the well-known physical knowledge that when light hits an object, the temperature of the object is increased. For the convenience of use, a glue substance is usually selected as the first bonding element 3. However, this brings about a problem that the temperature of the first bonding element 3 increases due to irradiation of light, thereby causing the first bonding element to be decomposed and inevitably damaged.

In view of the above problem, the present disclosure proposes an innovative idea of preventing the first bonding element 3 from being damaged by controlling the exit path of the first light 12. Specifically, the incident light 11 is firstly incident on the polarization splitting film 4 of the second optical element. The polarization splitting film changes the optical path of the first light 12, in such a manner that the first light 12 does not pass through the first bonding element 2. This idea prevents the glue substance from being damaged by direct irradiation of light, thereby improving the working performance of the polarization splitting device.

It should be noted that, in some modified implementations, since the polarization property of the incident light 11 is related to the type thereof, the polarization state of some incident light 11 is relatively easy to control (e.g. laser light). Therefore, the incident light 11 can be set as polarized light. For example, the incident light 11 is set as the first light 12. Then, during a whole working process of the polarization splitting device, the second light 13 will not appear. These modified implementations are mainly intended to control the exit path of the incident light 11, so as to cooperate with a specific optical instrument to receive the incident light 11 and realize the operation of the optical instrument.

If the incident light is laser light, the polarization properties of the incident light 11 can be determined based on the splitting properties of the polarization splitting film 4. If the polarization splitting film is designed to transmit P-polarized light and reflect S-polarized light, the incident light 11 is S-polarized light. On the contrary, if the polarization splitting film is designed to transmit S-polarized light and reflect P-polarized light, the incident light 11 is P-polarized light. The purpose of this design is to avoid generating the second light 13 and preventing the laser light from passing through the first bonding element 3 (due to the large light energy, laser light has a strong ability to damage the bonding element).

The first bonding element 3 is configured to provide a bonding function. Generally, the first bonding element may be glue, but the glue must be light-transmissive. In this embodiment, the first bonding element is optically transparent glue, and more specifically, optical glue.

It should be noted that, in this embodiment, the first light 12 is prevented from entering the first bonding element 3 to avoid light irradiation on the first bonding element 3. Therefore, in some modified implementations, the first bonding element can be prevented from being damaged by controlling the exit path of the second light 13, thereby solving the above problem.

Figure 2:
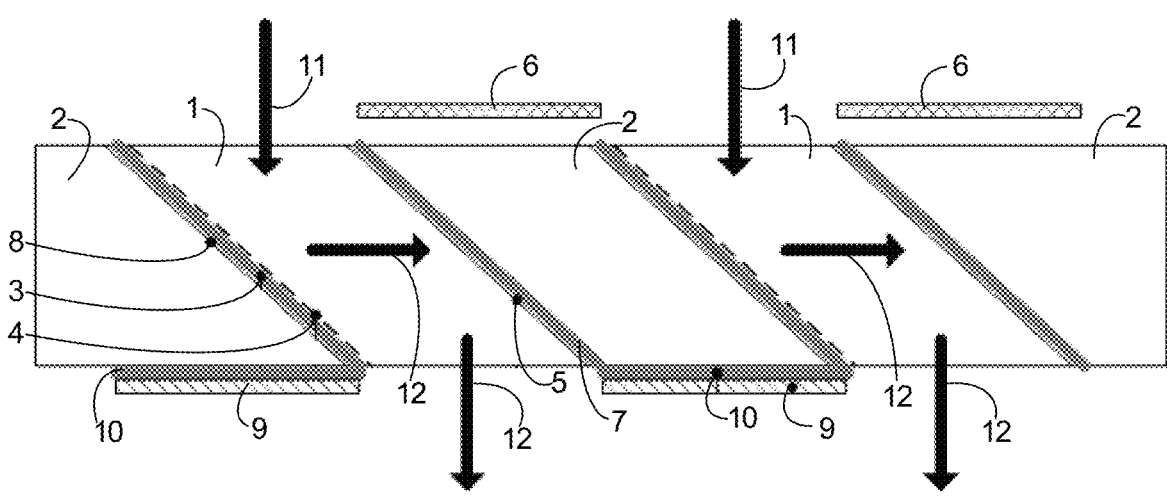
FIG. 2 is a schematic diagram according to a second embodiment of the present disclosure.
Figure 3:
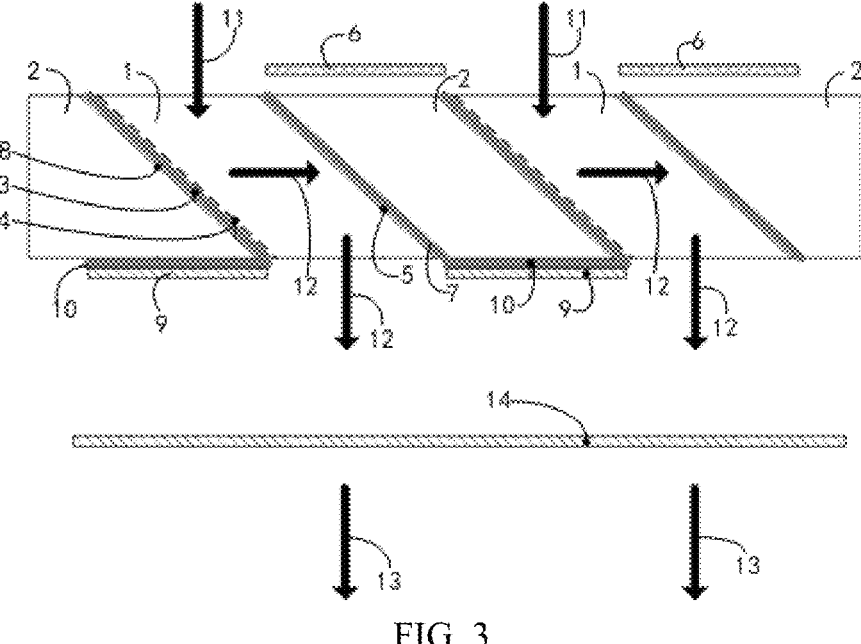
FIG. 3 is a schematic diagram according to a third embodiment of the present disclosure.

Referring to FIG. 2, a bonding interface where the second optical element 2 is bonded to the first optical element 1 is coated with an anti-reflective film 8. The anti-reflective film 8 is provided between the second optical element 2 and the first bonding element 3. That is, the polarization splitting film 4, the first bonding element 3 and the anti-reflective film 8 are arranged in an order from top to bottom. The anti-reflective film 8 is configured to guide the second light 13 to the exit path of the second optical element 2, and the anti-reflective film 8 improves the efficiency of separating the second light 13.

On the basis of the above solutions, this embodiment controls the incident path of the incident light 11 to improve the accuracy of the splitting work. To this end, the following improvements are made.

The first optical element 1 is configured to provide an incident path for the incident light 11. The polarization splitting device includes a diaphragm 6. The second optical element 2 includes the first interface parallel to the light incident surface of the first optical element 1. The diaphragm 6 is provided between the first interface of the second optical element 2 and the incident light, to prevent the incident light 11 from entering the second optical element 2.

The first interface of the second optical element 2 is flush with the light incident surface of the first optical element 1.

Second Embodiment

On the basis of the first embodiment, the second embodiment provides a polarization splitting structure, including: polarization splitting devices described in the first embodiment; and at least one second bonding element 7. The second bonding element 7 is light-transmissive, and is configured to bond every two adjacent ones of the polarization splitting devices.

In this embodiment, polarization splitting devices are provided to realize the polarization splitting work for incident light sources 11.

It should be noted that the function of the second bonding element 7 is similar to that of the first bonding element 3. Therefore, regarding the configuration of the second bonding element 7, reference can be made to the first bonding element 3 described in the first embodiment.

In some implementations, in order to better separate the first light 12 from the second light 13, the polarization splitting film 4 may be configured to allow the second light 13 to pass through, and to prevent the first light 12 from passing through and reflect the first light 12. Due to the reflective interface of the first optical element 1, the first light 12 reflected by the polarization splitting film 5 is directly reflected by the reflective film 5 of the reflective interface, thereby preventing the first light 12 from entering the second bonding element 7. That is, the first light 12 does not enter the first bonding element 3 and does not enter the second bonding element 7.

The polarization splitting structure includes first conversion elements 9. A number of the first conversion elements 9 is in a correspondence with a number of the polarization splitting devices. In each of the polarization splitting devices, the first conversion element 9 covers the exit side of the second optical element 2 for converting the second light 13 into the first light 12.

It should be noted that the first conversion elements 9 are configured to rotate the polarized light, thereby changing the polarized state of the light. In this embodiment, the first conversion element 9 is a half-wave plate.

The first conversion element 9 is bonded to the exit side of the second optical element 2 through a third bonding element 10. The third bonding element may be glue.

The polarization splitting structure includes a second conversion element 14. The second conversion element 14 covers each of the exit sides of all the polarization splitting devices, and is configured to convert the first light into the second light.

The second conversion element 14 is provided on the exit side of the entire polarization splitting structure, and is configured to convert the first light 12 that exits from the first optical element 1 and the second optical element 2 into the second light 13. Whether to provide the second conversion element 14 depends on the polarization properties of the light beam required in the actual optical path.

The function of the second conversion element is similar to that of the first conversion element 9. Therefore, it can be configured with reference to the first conversion elements 9, and is a half-wave plate.

Third Embodiment

The third embodiment provides a projection device, including: the polarization splitting device described in the first embodiment; or the polarization splitting structure described in the second embodiment.

In the technical field of projection display, the projection display usually includes liquid crystal display (LCD) projection display, liquid crystal on silicon (LCOS) projection display and digital light processing (DLP) projection display according to the different types of spatial light modulators applied.

A transmissive LCD display device and a reflective silicon-based LCOS display device require polarized light to work. However, the white light source is natural light in an unpolarized state and cannot be directly used for these two display devices. Therefore, to apply natural light to these two display devices, it is necessary to convert the natural light into polarized light by a polarizing device.

Different from those of the above two display devices, the spatial light modulator of a DLP projection display system does not require polarized light. Nevertheless, there are still some problems related to polarized light when the DLP projection display system achieves some functions. For example, to display by using a three-dimensional (3D) technology, it needs to polarize and convert the light. The problem here is that if the light exiting from the lens of the DLP projection device is polarized and converted, half of the light is lost. If the light is polarized in the light source to make the modulated light from the spatial light modulator be polarized light, the light utilization of the 3D display system can be improved, and the structure of the 3D projection device can be simplified. In addition, when the polarized light passes through the light splitting/combining prism, its spectrum has a narrower transition range, which can improve the utilization of broad-spectrum light (such as fluorescent light) and improve the overall energy efficiency of the projection device.

The light sources incident to the spatial light modulator generally include laser light and fluorescent light. Fluorescent light does not have a specific polarization direction, and thus it needs to be polarized and split before it is applicable to the above scenarios. The polarization state of the laser light can be well controlled. When the laser light is applied to the above scenarios, it is not necessary to perform polarization and splitting on the light source, and the polarized laser light can be directly selected. For specific technical solutions, reference may be made to the first embodiment, the second embodiment and the third embodiment.

The present disclosure is described in detail above with reference to the specific embodiments, but the present disclosure is not limited thereto. The scope of the present disclosure is not limited to the above-mentioned embodiments. Any equivalent modifications or changes made by those of ordinary skill in the art based on the contents disclosed herein should be included in the scope described in the claims.

What is claimed is:

1. A polarization splitting device, comprising a first optical element, wherein the first optical element comprises a light incident surface, a polarization splitting interface and a reflective interface, and the polarization splitting interface and the reflective interface are correspondingly arranged, wherein incident light enters the first optical element through the light incident surface, and is split into first light and second light through the polarization splitting interface; the first light is incident on the reflective interface after being reflected by the polarization splitting interface, and exits from the first optical element after being reflected by the reflective interface; and the second light exits from the first optical element after being transmitted through the polarization splitting interface, wherein the polarization splitting device further comprises a second optical element and a first bonding element, and wherein the second optical element is bonded to the polarization splitting interface of the first optical element through the first bonding element, and the second light transmitted from the polarization splitting interface enters the second optical element and is guided by and exits from the second optical element, and the first light reflected by the polarization splitting interface does not pass through the first bonding element, and a polarization splitting film coated on the polarization splitting prism forms the polarization splitting interface, a bonding interface where the second optical element is bonded to the first optical element is coated with an anti-reflective film, the anti-reflective film is provided between the second optical element and the first bonding element, in such a manner that the polarization splitting film, the first bonding element and the anti-reflective film are arranged in sequence.

2. The polarization splitting device according to claim 1, wherein the polarization splitting interface and the reflective interface are arranged in parallel, and the light incident surface is located between the polarization splitting interface and the reflective interface.

3. The polarization splitting device according to claim 1, wherein the first optical element and the second optical element each comprise a polarization beam splitting prism.

4. The polarization splitting device according to claim 1, further comprising a diaphragm, wherein the second optical element comprises a first interface parallel to the light incident surface of the first optical element; and the diaphragm is provided between the first interface of the second optical element and the incident light, and the diaphragm is configured to prevent the incident light from entering the second optical element.

5. A polarization splitting structure, comprising:

polarization splitting devices; and a second bonding element, wherein each of the polarization splitting devices comprises a first optical element, wherein the first optical element comprises a light incident surface, a polarization splitting interface and a reflective interface, and the polarization splitting interface and the reflective interface are correspondingly arranged;

wherein incident light enters the first optical element through the light incident surface, and is split into first light and second light through the polarization splitting interface; the first light is incident on the reflective interface after being reflected by the polarization splitting interface, and exits from the first optical element after being reflected by the reflective interface; and the second light exits from the first optical element after being transmitted through the polarization splitting interface;

wherein each of the polarization splitting devices comprises a second optical element and a first bonding element, wherein the second optical element is bonded to the polarization splitting interface of the first optical element through the first bonding element, and the second light transmitted from the polarization splitting interface enters the second optical element and is guided by and exits from the second optical element, and the first light reflected by the polarization splitting interface does not pass through the first bonding element, wherein the second bonding element is configured to bond every two adjacent ones of the polarization splitting devices, and the first light exits after being reflected by the reflective interface of the first optical element, without passing through the second bonding element, and a polarization splitting film coated on the polarization splitting prism forms the polarization splitting interface, a bonding interface where the second optical element is bonded to the first optical element is coated with an anti-reflective film, the anti-reflective film is provided between the second optical element and the first bonding element, in such a manner that the polarization splitting film, the first bonding element and the anti-reflective film are arranged in sequence.

6. The polarization splitting structure according to claim 5, further comprising first conversion elements, wherein a number of the first conversion elements is in one-to-one correspondence with a number of the polarization splitting devices, and for each of the polarization splitting devices, the first conversion element covers an exit side of the second optical element and is configured to convert the second light from the second optical element into the first light.

7. The polarization splitting structure according to claim 6, wherein the first conversion element is bonded, by a third bonding element, to an exit interface of the second optical element, wherein the second light exits from the exit interface of the second optical element.

8. The polarization splitting structure according to claim 6, further comprising a second conversion element, wherein the second conversion element covers an exit side of each of the polarization splitting devices, and is configured to convert the first light into the second light.

9. A projection device, comprising at least one polarization splitting device, wherein each of the at least one polarization splitting device comprises a first optical element, wherein the first optical element comprises a light incident surface, a polarization splitting interface and a reflective interface, and the polarization splitting interface and the reflective interface are correspondingly arranged, wherein incident light enters the first optical element through the light incident surface, and is split into first light and second light through the polarization splitting interface; the first light is incident on the reflective interface after being reflected by the polarization splitting interface, and exits from the first optical element after being reflected by the reflective interface; and the second light exits from the first optical element after being transmitted through the polarization splitting interface, wherein each of the at least one polarization splitting device further comprises a second optical element and a first bonding element, and wherein the second optical element is bonded to the polarization splitting interface of the first optical element through the first bonding element, and the second light transmitted from the polarization splitting interface enters the second optical element and is guided by and exits from the second optical element, and the first light reflected by the polarization splitting interface does not pass through the first bonding element, and a polarization splitting film coated on the polarization splitting prism forms the polarization splitting interface, a bonding interface where the second optical element is bonded to the first optical element is coated with an anti-reflective film, the anti-reflective film is provided between the second optical element and the first bonding element, in such a manner that the polarization splitting film, the first bonding element and the anti-reflective film are arranged in sequence.

10. The projection device according to claim 9, wherein the polarization splitting interface and the reflective interface are arranged in parallel, and the light incident surface is located between the polarization splitting interface and the reflective interface.

11. The projection device according to claim 9, wherein the first optical element and the second optical element each comprise a polarization beam splitting prism.

12. The projection device according to claim 9, further comprising a diaphragm, wherein the second optical element comprises a first interface parallel to the light incident surface of the first optical element; and the diaphragm is provided between the first interface of the second optical element and the incident light, and the diaphragm is configured to prevent the incident light from entering the second optical element.

13. The projection device according to claim 9, further comprising a second bonding element, wherein the second bonding element is configured to bond every two adjacent ones of the at least one polarization splitting device, and the first light exits after being reflected by the reflective interface of the first optical element, without passing through the second bonding element.

14. The projection device according to claim 13, further comprising first conversion elements, wherein a number of the first conversion elements is in one-to-one correspondence with a number of the polarization splitting devices, and for each of the polarization splitting devices, the first conversion element covers an exit side of the second optical element and is configured to convert the second light from the second optical element into the first light.

15. The projection device according to claim 13, wherein the first conversion element is bonded, by a third bonding element, to an exit interface of the second optical element, wherein the second light exits from the exit interface of the second optical element.

16. The projection device according to claim 13, further comprising a second conversion element, wherein the second conversion element covers an exit side of each of the polarization splitting devices, and is configured to convert the first light into the second light.

* * * * *